C. T. RAY.
SEED HOPPER.
APPLICATION FILED OCT. 11, 1917.
1,280,546.
Patented Oct. 1, 1918.
4 SHEETS—SHEET 3.
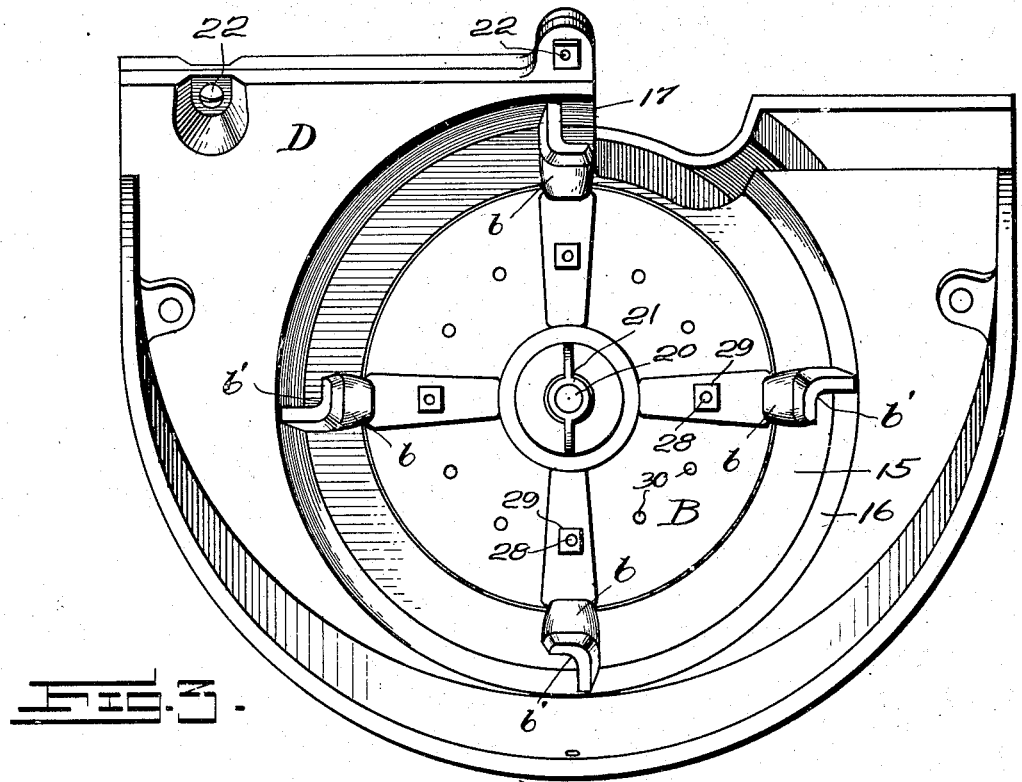
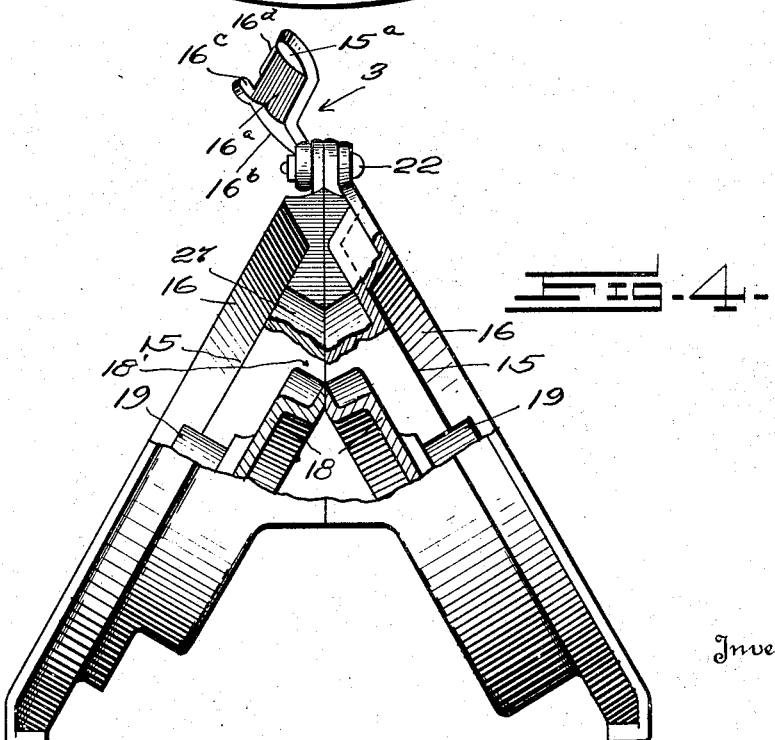
Inventor
Charles T. Ray

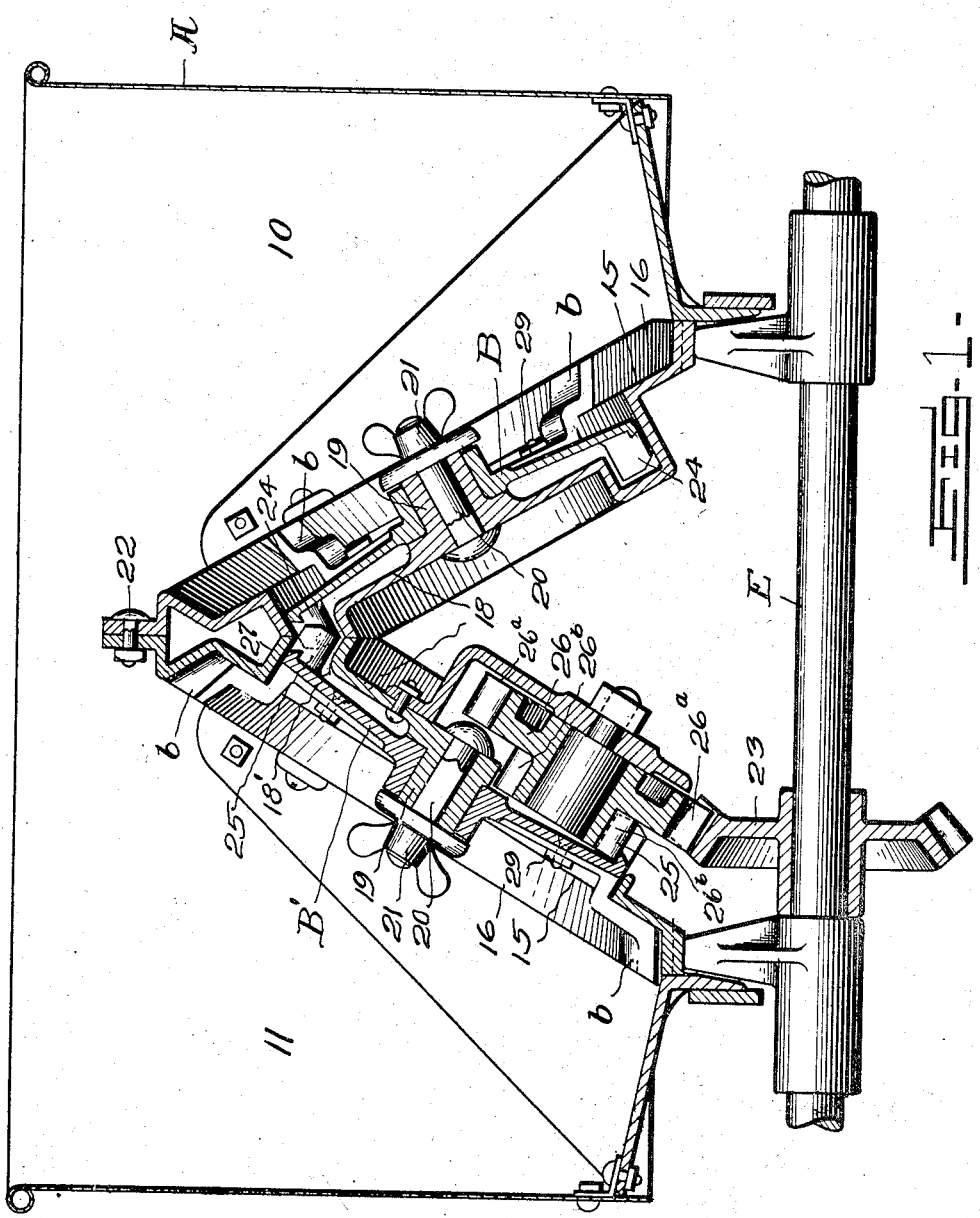

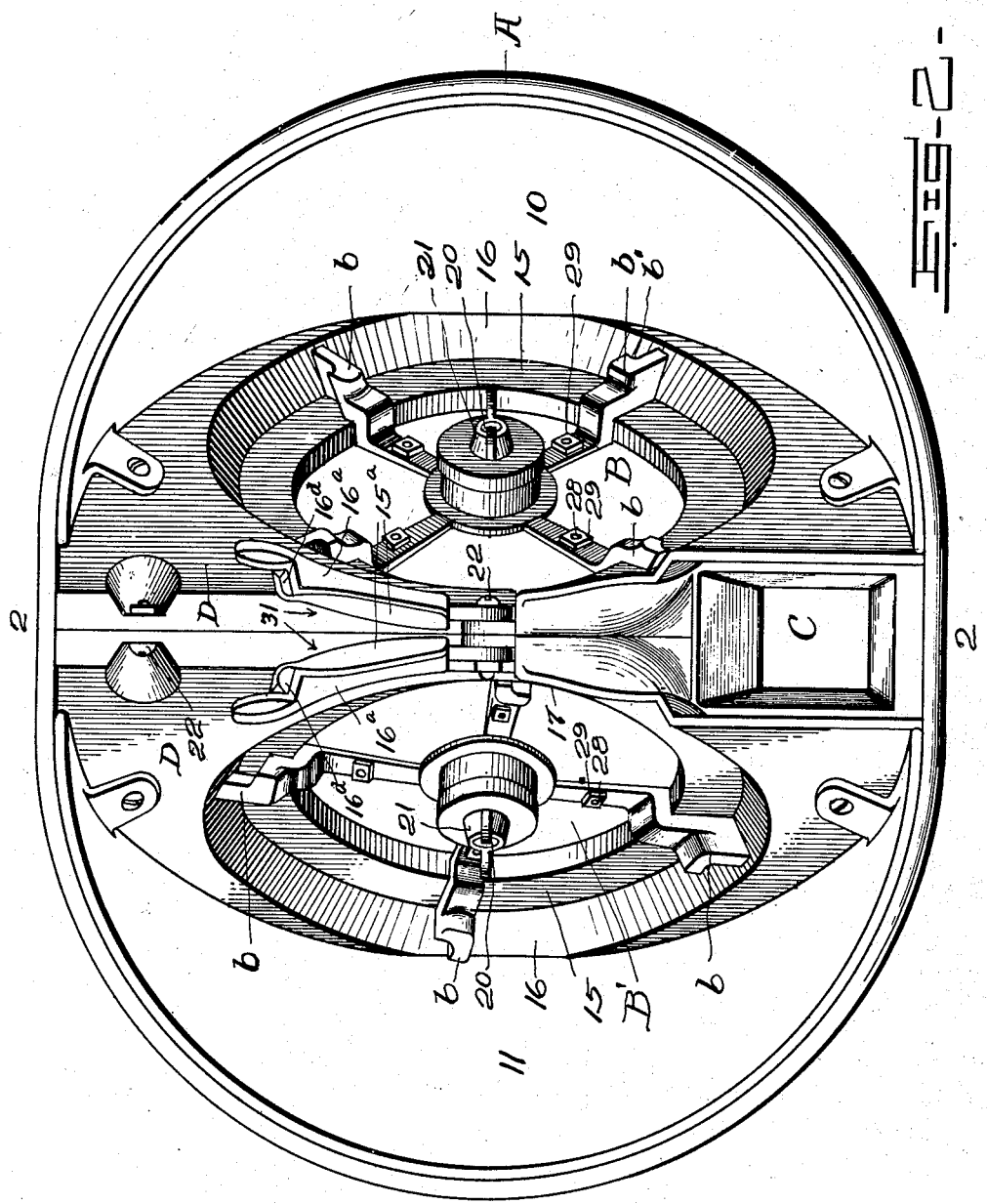

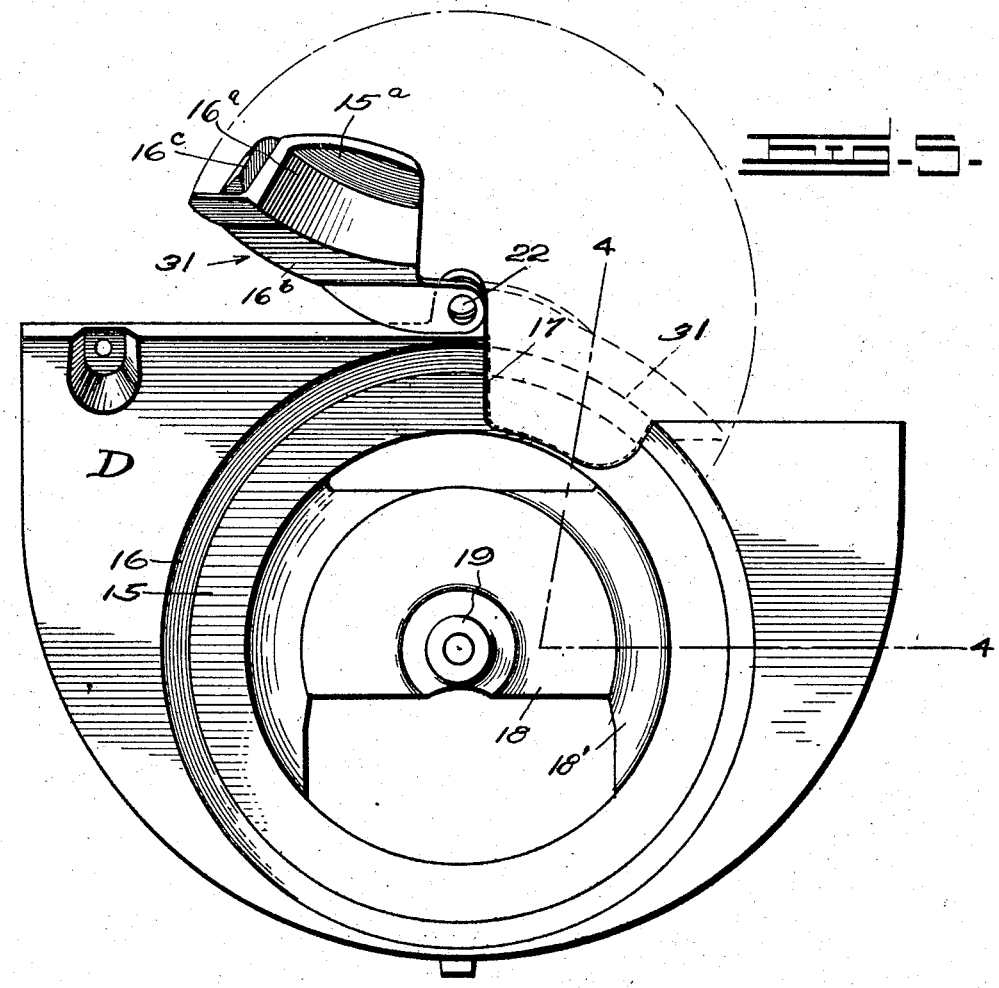
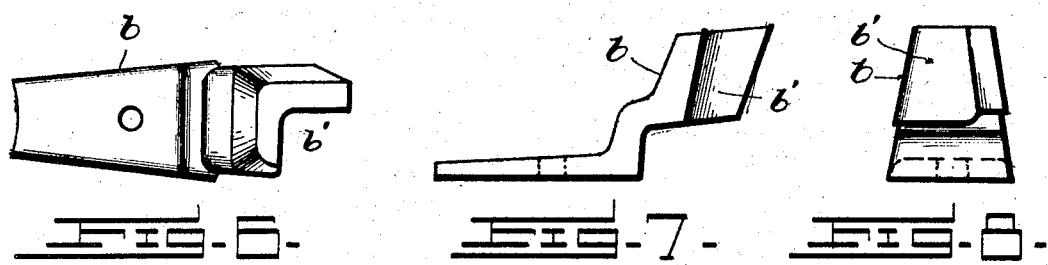

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

SEED-HOPPER.

1,280,546.  Specification of Letters Patent.  Patented Oct. 1, 1918.

Application filed October 11, 1917. Serial No. 195,996.

*To all whom it may concern:*

Be it known that I, CHARLES T. RAY, a citizen of the United States, residing at Louisville, in the county of Jefferson and State of Kentucky, have invented certain new and useful Improvements in Seed-Hoppers, of which the following is a specification.

The present invention relates to improvements in planters but especially to hoppers therefor of the style having a plurality of compartments for different kinds of seeds and a plurality of seed dropping means for said compartments.

The invention aims to provide a planter hopper having certain new and advantageous features, as will be apparent from the following description and claims: and especially, it has, for its ultimate object, to so correlate the seed dropping means and adjunctive parts of the hopper as to simplify the construction very substantially and render the same much more compact in form and less liable to get out of order.

This ultimate object and others which will hereinafter appear are very efficiently secured from the construction illustrated in the accompanying drawings, which exemplify the preferred construction and arrangement of parts and, in which drawings:—

Figure 1 is a vertical section on the line 1—1 of Fig. 2.

Fig. 2 is a plan view showing the parts arranged to plant seed alternately from the two compartments and in the same row.

Fig. 3 is a perspective view showing one of the seed feeding wheels and the corresponding partition, and also showing the upper edge of the adjacent partition, the hopper body and gates for closing the lateral openings between the partition and the seed spout being omitted.

Fig. 4 is a section on a line corresponding to the line 4—4 of Fig. 5, showing an end view of the two partitions, partly in section, with one of the gates open and the other closed.

Fig. 5 is a detail side view of one of the partitions, showing the gate open in full lines and closed in dotted outline.

Figs. 6, 7 and 8 are detail representations of one of the sweeps: Fig. 6 being a plan thereof, Fig. 7 a side view of the same and Fig. 8 an end view.

Similar characters of reference denote corresponding parts in the several views.

The hopper A which contains the improvements constituting this invention may be of any suitable size and shape and in practice may be mounted upon the frame of the planter in the usual or any suitable manner. It is provided with two separate seed compartments 10, and 11 containing seed feeding wheels, B and B' respectively which are rotated by appropriate gearing.

These wheels in the present invention are essentially disposed with their backs toward each other and preferably in a direction which is from the front toward the rear of the hopper, i. e., preferably in the general direction of travel of the planter, and they diverge from their top to their bottom surfaces. Each is provided with a plurality of radial arms or sweeps $b$ and these arms or sweeps extend outwardly beyond the peripheries of their wheels and form means by which the seeds are picked out from the mass in the bottom of the hopper and are elevated and individually discharged into a seed spout C, (Fig. 2) which conducts them to the seed bed which has been provided therefor.

The outer ends of the arms or sweeps are suitably formed to carry individual seed from the mass and deliver the same with certainty to the outlets hereinafter more particularly described, and the formation of said outer ends may vary in shape and size in accord with the particular character and sizes of seed to be planted. The particular shape which I prefer, however, shown most clearly in Figs. 2, 6, 7 and 8, has the outer corner cut away and slightly beveled inwardly and rearwardly to form seed pockets $b'$ adapted to any hard or comparatively hard seed of various shapes, such as maize, corn, beans, peas, and peanuts, for example. The inward and rearward beveling of each pocket assures the retention of a seed therein in the upward travel of the arms and as these pockets are entirely open at their forward sides surplus seeds will be permitted to fall along the forward face of the arms and be returned to the mass automatically, by gravity. In the planting of certain kinds of seeds which are very flexible or flat or sticky and of very irregular shapes, as potatoes for example, it may be expedient to employ an ejector for freeing the seeds from the pockets or sweeps, but hard seeds will gravitally roll out of the pocket into the outlets as the pockets containing said seeds are successively brought to said outlet.

The compartments 10, 11 are separated from each other by division plates D D which form partitions. These partitions diverge from their upper toward their lower ends and each is formed with two annular portions 15 and 16 which are arranged at an angle to each other and coöperate with the arms or sweeps in the elevation of seed from the mass. These annular portions 15 and 16 of each plate are interrupted, as at 17, to form the outlet hereinbefore referred to, which may be closed when desired by a gate 31, hereinafter described. The outer ends of the arms or sweeps move in such relation to the portions 15 and 16 that the portions 15 close the inner sides of the pockets and the portions 16 close the outer ends of said pockets, except where said portions are interrupted at the outlets. Hence those parts of the portions 15 and 16 lying between the place at which the seeds are engaged and the seed outlets constitute arcuate means by which the seeds are supported while they are being moved to the outlets.

Each of these partitions also has a depressed portion 18 provided with a boss 19. The wheels B are journaled upon these bosses 19 and are appropriately held in position, as by bolts 20 and wing nuts 21, for example. The plates preferably lie against each other adjacent to the outlet openings 17 and are secured together by a suitable number of bolts 22, for example. From this place they diverge downward and their outer and lower sides are suitably secured to the hopper body A.

E, Fig. 1, designates a transverse shaft which I prefer to employ as an element of the means for rotating the wheels B. This shaft is carried by the frame of the planter and is rotated in the travel of the planter by any means not necessary herein particularly to set forth because many such are well known and in common use: and it carries a gear 23 from which the wheels B derive motion.

The upward converging wheels B, B', are formed with peripheral teeth 24 and 25 respectively which mesh with each other at the point where the two wheels come together. One of said wheels therefore derives motion directly from the other. The latter wheel is preferably driven from the gear 23 on the shaft E, through an intermediate gear 26, having teeth 26ª which mesh with the teeth of the gear 23 and also having teeth 26ᵇ which mesh with the teeth 25 of the wheel B'. The teeth 23 and 24 of the respective wheels B, B' are mounted in the annular depressed portions 18' lying between the depressed portion 18 and an annular wall 27 which is joined to the portion 15. As already stated the portions 15 are cut away to form outlets at 17 and these cutaway portions afford access to the outer surfaces of the annular walls 27 which walls at this point lie close together (in the relation shown at the top of Fig. 1) and form a rearwardly and downwardly curved duct or channel which is approximately V-shaped in cross section. The seeds which are discharged laterally thereinto from either or both wheels B B' are gravitally conducted to the chute C by this channel.

Reverting to the arms or sweeps $b$: it will be noted that they extend radially along the surfaces of the wheels B, B' and have their outer ends offset vertically to form sweeps which lie against the walls 27 and surfaces 15 of the partitions. These arms are secured to the faces of their wheels in a manner which enables them to be readily detached or attached and placed at varying selected distances apart. Preferably this is provided for by securing them by means of screw bolts 28 and nuts 29 and by forming the wheels B, B' with openings 30 for the bolts 28, the number of said openings being equal to the maximum number of arms or sweeps which the wheel is intended to carry at any one time. It will thus be seen that the planter may be adapted to plant seeds at varying distances apart by simply varying the number of the arms or sweeps—that is to say, by removing some of the arms or sweeps when the seeds are to be planted at wider distances apart and by attaching additional arms when the distance between the planted seeds is to be reduced. It will also be seen that this correlation of a feeding wheel and detachable sweeps makes it unnecessary to provide different plates for different kinds of seeds as this result may be secured in a much cheaper and more convenient manner merely by providing different arms having different sizes of seed pockets for substantially different sizes of seeds. Thus, arms or sweeps with small pockets of the shape herein shown may be provided for comparatively fine seed, such as maize, sorghum or millet, for example, while arms of the same size and having pockets of the same shape but of larger size than the before mentioned pockets may be readily substituted by the farmer when he desires to adapt the planter to larger seed, as corn, beans, peas or the like.

The provision of the separate compartments with their respective seed dropping means discharging into a common spout C enables seeds of different kinds to be planted in the same row and the convenient regulation of the number and position of the arms or sweeps on the wheels B B' affords convenient facilities for serving various requirements of the farmer in planting. For example, the arms or sweeps of one wheel may be arranged to plant certain seeds at a certain distance at each revolution of the wheel while the arms or sweeps of the other wheel may be arranged to plant other seeds at a different distance, and, further, the arms or sweeps of both wheels may be arranged to plant the same number of seeds at each revolution of the wheels, either alternately by alternating the arms or sweeps of one wheel with the arms or sweeps of the other or simultaneously by setting the arms or sweeps of one wheel directly opposite the arms or sweeps of the other wheel.

Again, by closing one outlet 17 and leaving the other open, convenient facilities for planting different kinds of seeds in alternating rows—*i. e.*, one kind of seed in one or more rows and then a different kind of seed in one or more rows, and so on—is afforded. Gates 31 for the respective openings 17 are provided for this purpose. Each of these gates is pivoted at one end, preferably upon the bolt 22, as shown in Figs. 2 and 4, and each is shaped to conform to the shape of the adjacent part of its partition and to constitute when closed a part of the latter over which seed may be smoothly conducted. In other words, each has surfaces 15ª and 16ª which form continuations of the surfaces 15 and 16 of the adjacent partition. It also has an upper member 16ᵇ by one end of which it is pivoted on the bolt 22 and the opposite end of this member is recessed to provide a flange 16ᶜ which rests upon the upper edge of the partition adjacent one end of the opening 17, the corresponding end of the portion 16 being flanged at the rear as shown at 16ᵈ, to engage the rear surface of the portion 16 of said partition.

Moreover, particular attention is called to the fact that the arrangement of the seed elevating and discharging wheels B B' with their backs toward each other and especially when they are so arranged and are also inclined and disposed in a diverging relation is of the utmost importance as it assures the selective elevation of the seeds from the mass in the hopper and their delivery to the outlet common to both compartments and substantially conserves the space in the hopper. The diverging relation referred to has the additional advantage of conducing to further compactness and simplification of construction by making it possible to arrange the inlet to the spout C between the two compartments and to drive one wheel directly from the other, and by affording space between the diverging ends of the wheels for whatever gears are necessary or desirable to transmit motion from the driving shaft of the planter to the particular feeding wheel which is to receive motion therefrom.

In short, it will be seen that the ultimate object of the invention is completely secured from the detail construction and correlation of parts hereinbefore set forth, but nevertheless I would have it understood that changes in said correlation and construction of parts may be made without departing from the spirit of the invention or the scope of the subjoined claims.

Having thus described the invention what I believe to be new and desire to secure by Letters Patent, and what I therefore claim is:

1. A planter hopper having a plurality of seed compartments and seed elevating and delivering means for said compartments, including rotatable wheels arranged in the respective compartments and disposed with the back of one toward the back of the other and provided with elements for picking seed from a mass thereof and elevating the same.

2. A planter hopper having a plurality of seed compartments and provided with an outlet above its bottom, and seed elevating and delivering means for said compartments, including rotatable wheels arranged with the back of one toward the back of the other and having elements for picking seed from a mass thereof, elevating the same and discharging them into the outlet.

3. A planter hopper having a plurality of seed compartments and a seed outlet at an elevated point between the same, and seed elevating and delivering means for said compartments, said means including rotatable wheels arranged in the respective compartments and on opposite sides of the seed outlet and disposed with the back of one toward the back of the other and provided with elements for picking seed from a mass thereof, elevating the same and gravitally discharging them into the outlet.

4. A planter hopper having means dividing the same into a plurality of separate seed compartments and provided between the compartments with a seed discharge channel whose inlet is above the bottom of the hopper, and seed elevating and delivering means for said compartments, including rotatable wheels disposed with the back of one toward the back of the other and having elements for picking seed from a mass thereof and elevating the same to the inlet to the discharge channel.

5. A planter hopper comprising a plurality of seed compartments and provided with a seed outlet having communication with the compartments and with arcuate seed supporting means extending from the bottom of the hopper to the outlet, and rotatable wheels for the respective compartments, arranged with the back of one toward the back of the other and having elements which traverse the seed supporting means and elevate the seed along the same from the mass in the compartments to the outlet.

6. A planter hopper comprising a plurality of seed compartments and a discharge channel whose inlet is at a point above the bottom of the hopper, said compartments having arcuate seed supporting surfaces which extend from the bottom thereof to said inlet, and rotatable wheels in the respective compartments arranged with the back of one toward the back of the other and having elements which traverse the seed supporting surfaces and elevate the seed along the same to said inlet from the mass in the compartments.

7. A planter hopper having a plurality of seed compartments and seed elevating and delivering wheels in said compartments, said wheels being inclined and diverging from their upper toward their lower portions and arranged with their backs toward each other.

8. A planter hopper having a plurality of seed compartments and provided with a seed outlet at an elevated point between said compartments, and wheels rotatably mounted in said compartments, respectively, said wheels having means for elevating seed from the mass in the bottom of the compartments and delivering the same to the outlet and extending divergently from the outlet.

9. A planter hopper having a plurality of seed compartments and a seed outlet above the bottom of the hopper, and seed elevating and delivering means for said compartments, including upwardly converging rotatable wheels having toothed confronting surfaces arranged to communicate motion from one wheel to the other, said wheels also having elements for raising seed from the mass and delivering the same to the outlet.

10. A planter hopper comprising a plurality of seed compartments having seed outlets above the bottom of the compartments and arcuate seed supporting means extending from the bottom of the compartments to the outlets, upwardly converging rotatable wheels in said compartments, having toothed confronting surfaces arranged to communicate motion from one wheel to the other, said wheels also having projections which traverse the seed supporting means and elevate the seed along the same from the mass in the compartments to the outlets.

11. A planter hopper having a plurality of compartments with lateral seed outlets above the bottom thereof, and seed elevating and delivering means for said compartments, including rotatable wheels arranged on opposite sides of the outlet and converging upward thereto and provided with seed elevating projections having cutaway corners which form pockets from which the seeds are gravitally discharged when they reach the outlets.

12. A planter hopper comprising a plurality of seed compartments having lateral seed outlets above the bottoms thereof and arcuate seed supporting means extending from the bottoms of the compartments to the outlets, and upwardly converging rotatable wheels in said compartments, having toothed confronting surfaces arranged to communicate motion from one wheel to the other, said wheels also having projections which traverse the seed supporting means and have cutaway corners forming pockets which elevate seed along the seed supporting means and gravitally discharge the same at the outlets.

13. A planter hopper having a plurality of compartments and seed outlets above the bottom of the hopper, and seed elevating and delivering means for said compartments including rotatable wheels having intermeshing teeth for communicating motion from one wheel to the other and also having elements for moving the seeds to the outlets.

14. A planter hopper having upwardly converging partitions provided with walls which substantially meet to form an arcuate channel above the bottom of the hopper and between the partitions, said partitions having openings forming lateral outlets between the compartments and the channel, and seed elevating means including inclined rotatable wheels provided with elements for elevating seeds from the masses in the bottoms of the compartments to the outlets.

15. A planter hopper having upwardly converging partitions provided with depressions having walls which substantially meet to form an arcuate channel above the bottom of the hopper and between the partitions, the portions of said partitions adjacent the outer walls of the depressions forming seed supporting means and being interrupted at the place where the walls of the depressions meet to form lateral outlets between the compartments and the channel, and inclined rotatable wheels mounted in said depressions and having projections which traverse the seed supporting means and elevate seeds from the bottoms of the compartments to the outlets.

16. A planter hopper having upwardly converging partitions provided with depressions having walls which substantially meet to form an arcuate channel above the bottom of the hopper and between the partitions, said partitions having openings forming lateral outlets between the compartments and the channel, and upwardly converging rotatable wheels in said depressions, having intermeshing teeth for communicating motion from one to the other and also having elements for moving seeds from the bottoms of the compartments to the outlets.

17. A planter hopper comprising a plurality of upwardly converging partitions arranged back to back, and having lateral seed outlets above the bottom of the hopper, means for selectively closing said outlets, and seed elevating means operatively related to said partitions and delivering seeds to the outlets.

18. A planter hopper comprising a plurality of seed compartments having substantially annular seed supporting means formed with seed outlets above the bottoms of the compartments upwardly converging rotatable wheels arranged back to back in said compartments, said wheels having projections which traverse the substantially annular seed supporting means and elevate the seed along the same from the mass in compartments to the outlets.

19. A planter hopper comprising a plurality of seed compartments having substantially annular seed supporting means formed with seed outlets above the bottoms of the compartments, and rotatable wheels in said compartments having means which traverse the substantially annular seed supports and are provided with seed pockets, said wheels having their confronting surfaces formed with teeth which intermesh above the bottom of the compartments and diverging downward therefrom, and power means geared to one of the wheels.

20. A planter hopper comprising a plurality of upwardly converging partitions having walls which substantially meet above the bottom of the hopper to form the bottom of an arcuate seed outlet channel between the partitions, each of said partitions also having a substantially annular seed supporting portion arranged at an angle to the first mentioned wall and an opening for the egress of seeds to said channel, and rotatable wheels in said compartments having means which traverse the substantially annular seed supports and are provided with seed pockets, said wheels having their confronting surfaces formed with teeth which intermesh above the bottoms of the compartments and diverging downward therefrom, and power means geared to one of the wheels.

21. A planter hopper comprising a plurality of upwardly converging partitions having walls which substantially meet above the bottom of the hopper to form the bottom of an arcuate seed outlet channel between the partitions, each of said partitions also having a seed supporting portion arranged at an angle to the first-mentioned wall, and inclined seed elevating and discharging means in said compartments.

22. A planter hopper having a plurality of upwardly converging partitions forming a plurality of compartments therein, said partitions substantially meeting above the bottom of the hopper and each having a substantially annular wall and a seed supporting portion around said wall, the confronting portion of the partitions at the place where said partitions substantially meet conjointly forming an arcuate outlet channel for the seeds and said partitions having openings adjacent the channel for the egress of seeds from the compartments, and means in the compartments for elevating seeds along the seed supporting portions of the partitions and delivering them to said openings.

23. A planter having a plurality of upwardly converging partitions forming a plurality of compartments therein, said partitions substantially meeting above the bottom of the hopper and each having an axial depression and a seed supporting portion around the same, the confronting portions of the partitions at the place where said partitions substantially meet conjointly forming an arcuate outlet channel for the seeds and said seed supporting portions having openings adjacent the channel for the egress of seeds from the compartments, and seed elevating and delivering wheels mounted in the depressed portions of the partitions and provided with members having seed openings operatively related to the seed supporting portions of the partitions.

24. A planter hopper having a plurality of upwardly converging partitions forming a plurality of compartments therein, each partition having a plurality of substantially annular portions arranged at an angle to each other and forming a seed support, said supports being interrupted to permit the seeds to flow from the compartments and seed elevating and discharging means in each compartment.

25. A planter hopper having a plurality of upwardly converging partitions forming a plurality of compartments therein, each partition having a plurality of substantially annular portions arranged at an angle to each other and forming a seed support, said supports having seed outlets above the bottoms of the compartments, and means comprising a plurality of sweeps in each compartment for elevating and discharging the seeds from the compartment, each of said sweeps traversing one of the substantially annular portions and having its outer end in operative relation to the other substantially annular portion of the adjacent partition and having a cutaway corner to form a seed pocket.

26. A planter having a plurality of upwardly converging partitions forming a plurality of compartments therein, each partition having a plurality of substantially annular portions arranged at an angle to each other and forming a seed support, and each partition also having a substantially annular wall joined to one of said portions and arranged at an angle thereto, the two partitions substantially meeting above the bottom of the hopper and the confronting walls and adjacent seed supporting portions at the place where the partitions meet conjointly forming an arcuate seed outlet channel between the compartments, the seed supporting portions of the partitions having openings to said channel, and seed elevating and delivering wheels mounted in the portions of the partitions bounded by said walls and provided with radial arms or sweeps whose outer ends have seed pockets and are operatively related to the seed supporting portions of the partitions.

27. A planter having a plurality of upwardly converging partitions forming a plurality of compartments therein, said partitions substantially meeting above the bottom of the hopper and formed to provide a substantially annular seed supporting portion in each compartment and an arcuate seed outlet channel between the compartments, the seed supporting portions of the partitions having openings for the egress of seeds from the compartments to the channel, means for closing said openings selectively, and seed elevating and delivering means in the compartments.

28. A planter hopper comprising a plurality of seed compartments having annular seed supporting surfaces interrupted to form lateral seed outlets above the bottoms of the partitions, gates movable to open and close the respective outlets, and having surfaces which conform to and when the gates are closed form continuations of said seed supporting surfaces, and rotatable wheels in said compartments having elements which traverse the seed supporting surfaces and selectively move seed along the same from the mass in the compartments to the outlets.

29. A planter hopper comprising a plurality of inclined partitions having annular seed supporting surfaces interrupted to form lateral seed outlets above the bottoms of the partitions, independently pivoted gates having coresponding surfaces to form continuations thereof when the gates are closed, and inclined wheels mounted to rotate upon said partitions and having arms or sweeps which project radially therefrom and traverse said seed supporting surfaces.

30. A planter hopper having a plurality of seed compartments and means for delivering seed therefrom to a common seed bed, said compartments having seed outlets, the seed delivering means including a rotatable wheel in each compartment, each of said wheels having a plurality of independently removable and attachable seed elevating and delivering sweeps which project radially therefrom, whereby the number and position of the sweeps on one wheel may be changed relatively to the number and position of the sweeps on the other wheel and the necessity of changing the wheels is avoided.

31. In a seeding means, a plurality of inclined seed elevating and delivering wheels arranged back to back and substantially meeting above their lower portions, said wheels having gear teeth which intermesh with each other at the place where the wheels meet and diverging from said place, and a driving connection to one of said wheels.

32. A planter hopper comprising a rotatable seed elevating and delivering wheel arranged at an inclination therein and provided with a plurality of detachable sweeps and having means for securing the sweeps in various selected positions thereover, said sweeps projecting outward beyond the periphery of the wheel and having their outer corners cut away to form seed pockets.

33. In a seeding means, a seed elevating and delivering wheel, having a plurality of independently removable and attachable sweeps projecting radially beyond its periphery and each having its outer corner cut away and beveled inwardly to form a forwardly open seed retaining pocket.

34. A planter hopper having a seed elevating and delivering wheel provided with a plurality of radial arms projecting at their outer ends beyond the periphery of the wheel and each having an outer corner cut away to form a pocket.

35. A planter hopper having a seed elevating and delivering wheel provided with a plurality of radial arms projecting at their outer ends beyond the periphery of the wheels and each having an outer corner cut away and the wall of the cutaway portion beveled inwardly to form a seed retaining pocket.

In testimony whereof I affix my signature in the presence of two witnesses.

CHARLES T. RAY.

Witnesses:
C. L. McClure,
W. M. Johnston.